(12) United States Patent
Goto et al.

(10) Patent No.: US 12,738,480 B2
(45) Date of Patent: Sep. 15, 2026

(54) NON-AQUEOUS ELECTROLYTE SECONDARY BATTERY

(71) Applicant: Panasonic Intellectual Property Management Co., Ltd., Osaka (JP)

(72) Inventors: Natsumi Goto, Hyogo (JP); Takashi Ko, Osaka (JP); Sho Tsuruta, Osaka (JP); Kohei Kintsu, Osaka (JP); Fumiharu Niina, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 645 days.

(21) Appl. No.: 18/027,802

(22) PCT Filed: Aug. 18, 2021

(86) PCT No.: PCT/JP2021/030127
§ 371 (c)(1),
(2) Date: Mar. 22, 2023

(87) PCT Pub. No.: WO2022/070648
PCT Pub. Date: Apr. 7, 2022

(65) Prior Publication Data

US 2023/0335717 A1 Oct. 19, 2023

(30) Foreign Application Priority Data

Sep. 30, 2020 (JP) ................................ 2020-164578

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/131* (2013.01); *H01M 4/505* (2013.01); *H01M 4/525* (2013.01); *H01M 2004/028* (2013.01)

(58) Field of Classification Search
CPC ...... H01M 4/366; H01M 4/131; H01M 4/505; H01M 4/525; H01M 4/364;
(Continued)

(56) References Cited

U.S. PATENT DOCUMENTS

2014/0162132 A1 6/2014 Ishii et al.
2017/0047609 A1 * 2/2017 Han ...................... H01M 4/131
(Continued)

FOREIGN PATENT DOCUMENTS

CN 107636868 A 1/2018
CN 109713297 A 5/2019
(Continued)

OTHER PUBLICATIONS

International Search Report dated Oct. 19, 2021, issued in counterpart International Application No. PCT/JP2021/030127.
(Continued)

*Primary Examiner* — Aiqun Li
(74) *Attorney, Agent, or Firm* — WHDA, LLP

(57) ABSTRACT

Provided is a non-aqueous electrolyte secondary battery, wherein: a positive electrode active material includes a lithium transition metal composite oxide containing at least Ni, Mn, and B; 80 mol %≤Ni≤95 mol %; 0 mol %<Mn≤20 mol %; 0 mol %<B≤3 mol %; the lithium transition metal composite oxide has B at least on the surface thereof; and a negative electrode mixture layer has B at least on the surface thereof, and contains B in an amount of 30-1000 mass ppm with respect to the total mass of the negative electrode mixture layer.

4 Claims, 1 Drawing Sheet

(51) Int. Cl.
*H01M 4/131* (2010.01)
*H01M 4/505* (2010.01)
*H01M 4/525* (2010.01)

(58) Field of Classification Search
CPC ..... H01M 2004/028; H01M 2004/021; H01M 10/0525; C01P 2002/52; C01P 2004/84; Y02E 60/10; C01G 53/50
See application file for complete search history.

(56) References Cited

U.S. PATENT DOCUMENTS

| | | | |
|---|---|---|---|
| 2018/0151873 | A1 | 5/2018 | Matsuno et al. |
| 2019/0044135 | A1 | 2/2019 | Du et al. |

FOREIGN PATENT DOCUMENTS

| | | | |
|---|---|---|---|
| CN | 109786681 | A | 5/2019 |
| CN | 110085814 | A | 8/2019 |
| EP | 3349276 | A2 | 7/2018 |
| JP | 2013-137947 | A | 7/2013 |
| JP | 2014-116111 | A | 6/2014 |
| JP | 2015-088343 | A | 5/2015 |
| JP | 2016-225199 | A | 12/2016 |
| JP | 2019-061782 | A | 4/2019 |
| KR | 10-2011-0138606 | A | 12/2011 |
| KR | 20170075596 | A | 7/2017 |
| WO | 2018/110188 | A1 | 6/2018 |
| WO | 2020/044614 | A1 | 3/2020 |

OTHER PUBLICATIONS

Park et al., “Improved Cycling Stability of Li [Ni 0.90 Co 0.05 Mn 0.05] O2 Trough Microstructure Modification by Boron Doping for Li-Ion Batteries”, Advanced Energy Materials, Jul. 11, 2018, pp. 1-9, Cited in EESR dated Feb. 19, 2024.
Jung et al., “Nickel, Manganese, and Cobalt Dissolution from Ni-Rich NMC and Their Effects on NMC622-Graphite Cells”, Journal of the Electrochemical Society, Jan. 11, 2019, pp. A378-A389, Cited in EESR dated Feb. 19, 2024.
Extended European Search Report dated Feb. 19, 2024, issued in counterpart application No. 21874951.3. (10 pages).
Office Action dated Dec. 25, 2025, issued in counterpart CN Application No. 202180064109.X, with partial English translation. (10 pages).
Office Action dated May 9, 2026, issued in counterpart CN Application No. 202180064109.X, with partial English translation. (11 pages).

* cited by examiner

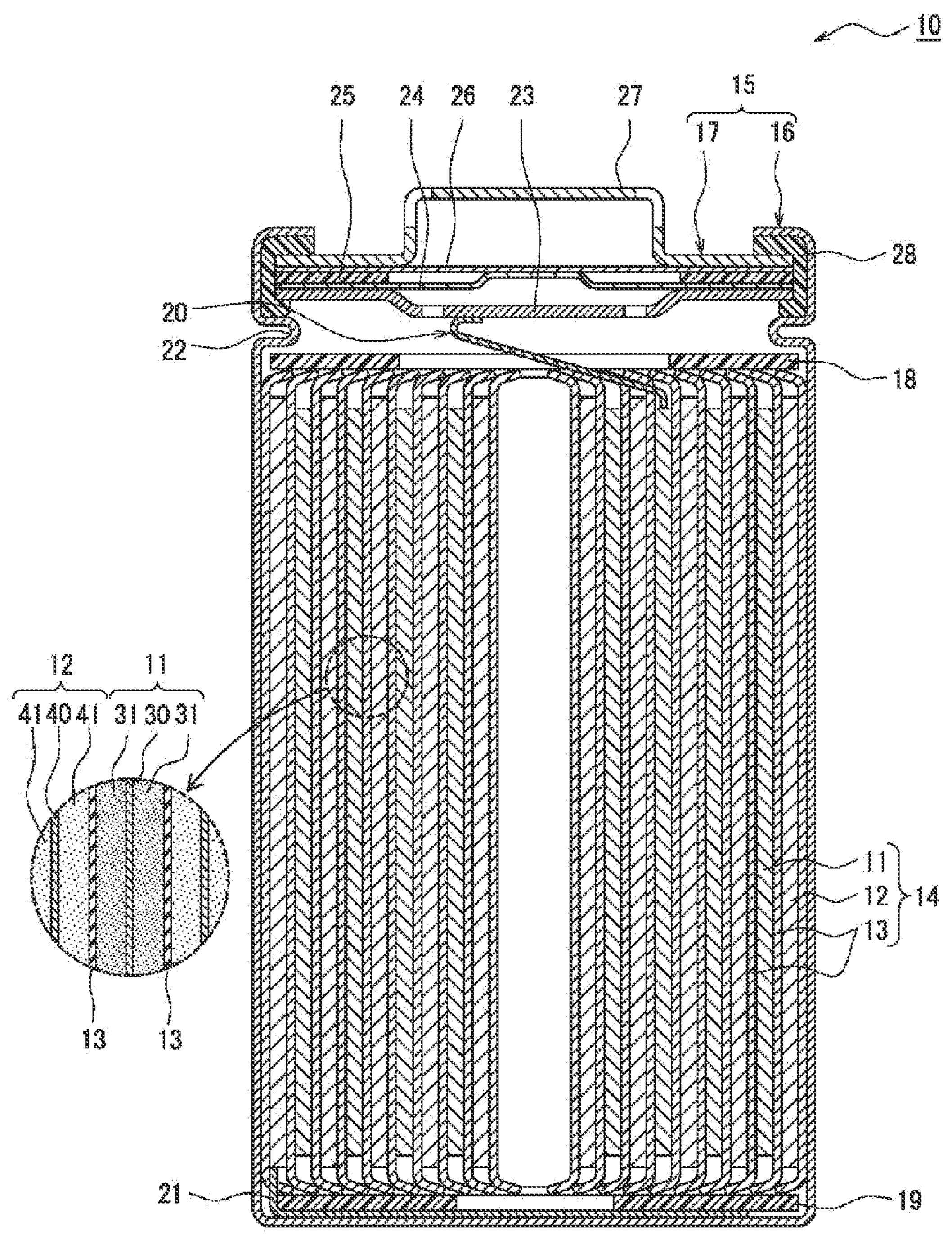
10
25
24
26
23
27
15
17
16
28
20
22
18
12
11
41
40
41
31
30
31
13
13
11
12
13
14
21
19

NON-AQUEOUS ELECTROLYTE SECONDARY BATTERY

CROSS REFERENCE TO RELATED APPLICATIONS

This Application is the National Stage of International Application No. PCT/JP2021/030127, filed Aug. 18, 2021, which claims priority from Application No. 2020-164578 filed on Sep. 30, 2020 in Japan. The entire contents of these applications are incorporated herein by reference in their entirety.

TECHNICAL FIELD

The present disclosure relates to a non-aqueous electrolyte secondary battery.

BACKGROUND ART

A lithium-transition metal composite oxide is used as a positive electrode active material, and for a purpose of improvement of battery characteristics, investigated is modification of a surface of the lithium-transition metal composite oxide. For example, Patent Literature 1 discloses that partially covering a surface of a lithium-transition metal composite oxide with an inorganic oxide layer such as aluminum oxide may improve an initial capacity and cycle characteristics of a battery.

Patent Literature 2 discloses that covering a surface of a lithium-nickel composite oxide with lithium metaborate and nickel oxide and setting the coverage of lithium metaborate to 85% or more and less than 95% may rise a charge voltage of a battery and improve characteristics such as cycle characteristics.

CITATION LIST

Patent Literature

PATENT LITERATURE 1: Japanese Unexamined Patent Application Publication No. 2014-116111

PATENT LITERATURE 2: Japanese Unexamined Patent Application Publication No. 2013-137947

SUMMARY

In recent years, a lithium-transition metal composite oxide with a high Ni content has attracted attention as a positive electrode active material with a high energy density. However, the lithium-transition metal composite oxide with a high Ni content has a problem of eluting Ni or metal elements other than Ni, such as Mn, by repeated charges and discharges at high temperature, and precipitating the eluted metal elements such as Ni and Mn on a negative electrode to lower a battery capacity. The cycle characteristics at high temperature is not investigated in the art disclosed in Patent Literatures 1 and 2, and the art still has a room for improvement.

A non-aqueous electrolyte secondary battery of an aspect of the present disclosure comprises: a positive electrode; a negative electrode; and a non-aqueous electrolyte. The positive electrode has a positive electrode current collector and a positive electrode mixture layer formed on a surface of the positive electrode current collector and including a positive electrode active material, the positive electrode active material includes a lithium-transition metal composite oxide containing at least Ni, Mn, and B, a proportion of Ni in the lithium-transition metal composite oxide based on a total amount of metal elements excluding Li is within a range of 80 mol %≤Ni≤95 mol %, a proportion of Mn in the lithium-transition metal composite oxide based on the total amount of metal elements excluding Li is within a range of 0 mol %<Mn≤20 mol %, a proportion of B in the lithium-transition metal composite oxide based on the total amount of metal elements excluding Li is within a range of 0 mol %<B≤3 mol %, the lithium-transition metal composite oxide has B present at least on a surface thereof, the negative electrode has a negative electrode current collector and a negative electrode mixture layer formed on a surface of the negative electrode current collector and including a negative electrode active material, and the negative electrode mixture layer has B present at least on a surface thereof, and contains 30 mass ppm or more and 1000 mass ppm or less of B based on a total mass of the negative electrode mixture layer.

According to the non-aqueous electrolyte secondary battery of an aspect of the present disclosure, the high capacity may be maintained and the lowering of the battery capacity with charge and discharge at high temperature may be inhibited.

BRIEF DESCRIPTION OF DRAWING

FIG. 1 is a vertical sectional view of a non-aqueous electrolyte secondary battery of an example of an embodiment.

DESCRIPTION OF EMBODIMENTS

A layered structure of a lithium-transition metal composite oxide included in a positive electrode active material has a transition metal layer, a Li layer, and an oxygen layer. Li ions present in the Li layer are reversibly abstracted and inserted to proceed charge and discharge reactions of the battery. When a lithium-transition metal composite oxide with a high Ni content is used, many Li ions are abstracted from the Li layer during charge of the battery to collapse the layered structure, leading to the lowering of the battery capacity in some cases. In particular, charge and discharge at high temperature cause the layered structure to be highly active and to be easily destabilized. Thus, Ni and the like are eluted from the transition metal layer and the deterioration of the layered structure is proceeded to be likely to lower the battery capacity. In addition, precipitation of Ni and the like, which are eluted form the positive electrode, on the negative electrode also lower the battery capacity.

The present inventors have made intensive investigation to solve the above problem, and have consequently found that, by using a positive electrode active material having B present on a surface of a lithium-transition metal composite oxide including Ni and the like, and by allowing B to be present on a surface of the negative electrode mixture layer by the supply of B from the positive electrode to the negative electrode, the charge-discharge cycle characteristics at high temperature is specifically improved when the B concentration in the negative electrode mixture layer is within a specific range. For the positive electrode, it is considered that B present on the surface of the positive electrode active material forms a coating, which inhibits the elution of Ni and the like. For the negative electrode, it is considered that the precipitated Ni and the like and B present together on the surface of the negative electrode mixture layer inhibit the deterioration caused by the precipitated Ni and the like. In order to supply a preferable amount of B from the positive electrode to the negative electrode, high-temperature aging may be performed at a temperature of approximately 60° C., for example. The battery after this high-temperature aging treatment includes the positive electrode active material having B present on the surface thereof and having a predetermined composition, and the negative electrode mixture layer having a predetermined amount of B present on the surface thereof. This combination generates a specific synergistic effect to improve the high-temperature cycle characteristics.

Hereinafter, an example of an embodiment of the non-aqueous electrolyte secondary battery according to the present disclosure will be described in detail. Hereinafter, a cylindrical battery in which a wound electrode assembly is housed in a cylindrical exterior will be exemplified, but the electrode assembly is not limited to a wound electrode assembly, and may be a laminated electrode assembly in which a plurality of positive electrodes and a plurality of negative electrodes are alternately stacked one by one with a separator interposed therebetween. The exterior is not limited to a cylindrical exterior, and may be, for example, a rectangular exterior, a coin-shaped exterior, or a battery case composed of laminated sheets including a metal layer and a resin layer.

FIG. 1 is a sectional view of a non-aqueous electrolyte secondary battery 10 of an example of an embodiment. As exemplified in FIG. 1, the non-aqueous electrolyte secondary battery 10 comprises an electrode assembly 14, a non-aqueous electrolyte, and a battery case 15 housing the electrode assembly 14 and the non-aqueous electrolyte. The electrode assembly 14 has a wound structure in which a positive electrode 11 and a negative electrode 12 are wound with a separator 13 interposed therebetween. The battery case 15 is composed of a bottomed cylindrical exterior housing can 16 and a sealing assembly 17 sealing an opening of the exterior housing can 16.

The electrode assembly 14 is composed of the elongated positive electrode 11, the elongated negative electrode 12, two elongated separators 13, a positive electrode tab 20 bonded to the positive electrode 11, and a negative electrode tab 21 bonded to the negative electrode 12. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). The two separators 13 are formed to be one size larger than at least the positive electrode 11, and disposed to, for example, sandwich the positive electrode 11.

The non-aqueous electrolyte secondary battery 10 comprises insulating plates 18 and 19 disposed on the upper and lower sides of the electrode assembly 14, respectively. In the example illustrated in FIG. 1, the positive electrode tab 20 attached to the positive electrode 11 extends through a through hole in the insulating plate 18 toward a side of the sealing assembly 17, and the negative electrode tab 21 attached to the negative electrode 12 extends along an outside of the insulating plate 19 toward the bottom side of the exterior housing can 16. The positive electrode tab 20 is connected to a lower surface of a bottom plate 23 of the sealing assembly 17 by welding or the like, and a cap 27 of the sealing assembly 17 electrically connected to the bottom plate 23 becomes a positive electrode terminal. The negative electrode tab 21 is connected to a bottom inner surface of the exterior housing can 16 by welding or the like, and the exterior housing can 16 becomes a negative electrode terminal.

The exterior housing can 16 is, for example, a bottomed cylindrical metallic container. A gasket 28 is provided between the exterior housing can 16 and the sealing assembly 17 to seal the inside space of the battery case 15. The exterior housing can 16 has a groove 22 that is formed by, for example, pressing a side wall thereof from the outside and that supports the sealing assembly 17. The groove 22 is preferably formed in a circular shape along a circumferential direction of the exterior housing can 16, and supports the sealing assembly 17 with the upper surface thereof.

The sealing assembly 17 has a structure having the bottom plate 23, a lower vent member 24, an insulating member 25, an upper vent member 26, and the cap 27, which are stacked in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected to each other at respective central parts thereof, and the insulating member 25 is interposed between the respective circumferential parts of the vent members 24 and 26. If the internal pressure of the battery increases due to abnormal heat generation, the lower vent member 24 is deformed so as to push the upper vent member 26 toward the cap 27 side and breaks, resulting in cutting off of an electrical pathway between the lower vent member 24 and the upper vent member 26. If the internal pressure further increases, the upper vent member 26 breaks, and gas is discharged through the opening of the cap 27.

Hereinafter, the positive electrode 11, the negative electrode 12, the separator 13, and the non-aqueous electrolyte, which constitute the non-aqueous electrolyte secondary battery 10, particularly a positive electrode active material included in a positive electrode mixture layer 31 constituting the positive electrode 11, will be described in detail.

[Positive Electrode]

The positive electrode 11 has a positive electrode current collector 30 and a positive electrode mixture layer 31 formed on a surface of the positive electrode current collector 30. For the positive electrode current collector 30, a foil of a metal stable within a potential range of the positive electrode 11, such as aluminum and an aluminum alloy, a film in which such a metal is disposed on a surface layer thereof, and the like may be used. The positive electrode mixture layer 31 includes a positive electrode active material, a conductive agent, and a binder. The positive electrode 11 may be produced by applying a positive electrode mixture slurry including the positive electrode active material, the conductive agent, the binder, and the like on the surface of the positive electrode current collector 30, drying and subsequently compressing the applied film to form the positive electrode mixture layers 31 on both the surfaces of the positive electrode current collector 30.

Examples of the conductive agent included in the positive electrode mixture layer 31 may include a carbon material such as carbon black, acetylene black, Ketjenblack, and graphite. Examples of the binder included in the positive electrode mixture layer 31 may include a fluororesin such as polytetrafluoroethylene (PTFE) and polyvinylidene fluoride (PVdF), polyacrylonitrile (PAN), a polyimide, an acrylic resin, and a polyolefin. With these resins, carboxymethylcellulose (CMC) or a salt thereof, polyethylene oxide 19 (PEO), and the like may be used in combination.

The positive electrode active material includes a lithium-transition metal composite oxide. The lithium-transition metal composite oxide has a layered structure including a Li layer in which Li is reversibly abstracted and inserted.

Examples of the layered structure include a layered structure belonging to the space group R-3m and a layered structure belonging to the space group C2/m. The lithium-transition metal composite oxide preferably has the layered structure belonging to the space group R-3m in terms of a higher capacity, stability of the crystalline structure, and the like. The positive electrode active material is mainly composed of the lithium-transition metal composite oxide, and may be constituted with substantially only the lithium-transition metal composite oxide. The positive electrode active material may include a composite oxide other than the lithium-transition metal composite oxide or other compounds within a range not impairing the object of the present disclosure.

The lithium-transition metal composite oxide is of, for example, secondary particles formed by aggregation of a plurality of primary particles. A particle diameter of the primary particles constituting the secondary particle is, for example, 0.05 μm to 1 μm. The particle diameter of the primary particles is measured as a diameter of a circumscribed circle in a particle image observed with a scanning electron microscope (SEM). The lithium-transition metal composite oxide is of particles having a median diameter (D50) on a volumetric basis of, for example, 3 μm to 30 μm, preferably 5 μm to 25 μm, particularly preferably 7 μm to 15 μm. The D50, also referred to as a median diameter, means a particle diameter at which a cumulative frequency is 50% from a smaller particle diameter side in a particle size distribution on a volumetric basis. The particle size distribution of the lithium-transition metal composite oxide may be measured by using a laser diffraction-type particle size distribution measuring device (for example, MT3000II, manufactured by MicrotracBEL Corp.) with water as a dispersion medium.

The lithium-transition metal composite oxide contains at least Ni, Mn, and B. That is, in the lithium-transition metal composite oxide, Ni, Mn, and B are essential components.

A proportion of Ni in the lithium-transition metal composite oxide based on a total amount of metal elements excluding Li is within a range of 80 mol %≤Ni≤95 mol %, and preferably within a range of 80 mol %≤Ni≤90 mol %. The Ni content of 80 mol % or more yields a battery with a high energy density, Meanwhile, the Ni content of more than 95 mol % causes contents of the other metal elements to be excessively low, and fails to achieve the stability of the layered structure of the lithium-transition metal composite oxide, leading to failure to inhibition of erosion of the particle surfaces.

A proportion of Mn in the lithium-transition metal composite oxide based on the total amount of metal elements excluding Li is within a range of 0 mol %<Mn≤20 mol %, and preferably within a range of 3 mol %≤Mn≤10 mol %. Since an oxidation number of Mn does not change during charge and discharge, containing Mn in the transition metal layer is considered to stabilize the structure of the transition metal layer.

A proportion of B in the lithium-transition metal composite oxide based on the total amount of metal elements excluding Li is within a range of 0 mol %<B≤3 mol %, and preferably within a range of 0.1 mol %≤B≤2 mol %. In addition, the lithium-transition metal composite oxide has B present at least on the surface thereof. This presence allows B present on the surface of the positive electrode active material to form a coating, and the elution of Ni and the like may be inhibited. As described later, B is transferred from the positive electrode to the negative electrode to be present together with Ni and the like precipitated on the surface of the negative electrode mixture layer, and deterioration caused by the precipitated Ni and the like may be inhibited.

The surface of the lithium-transition metal composite oxide means a particle surface and its proximity of the lithium-transition metal composite oxide, for example, a surface-proximity region within 30 nm from the particle surface. Since the lithium-transition metal composite oxide is of typically the secondary particles formed by aggregation of a plurality of the primary particles, B is preferably present on the surface of the secondary particles and in the surface proximity of the secondary particles at a high concentration. The distribution of B in the lithium-transition metal composite oxide may be analyzed by TEM-EDX or the like.

B may be present in a state of a boron compound on the surface of the lithium-transition metal composite oxide. Examples of the boron compound include boric acid ($H_3BO_3$), boron oxide ($B_2O_3$), and lithium borate ($LiBO_2$ and $Li_2B_4O_7$). The boron compound may be formed so as to entirely cover the surface of the lithium-transition metal composite oxide, and may be scatteringly present on the surface of the lithium-transition metal composite oxide. When the boron compound is scatteringly present on the surface of the lithium-transition metal composite oxide, a particle diameter of the boron compound is typically smaller than the particle diameter of the primary particles constituting the lithium-transition metal composite oxide. The particles of the boron compound may be observed with an SEM. The boron compound preferably adheres to the surfaces of the secondary particles constituting the lithium-transition metal composite oxide in a wide range, not unevenly present on a part thereof. A thickness of the boron compound on the surface of the lithium-transition metal composite oxide may be, for example, 10 nm to 100 nm.

The lithium-transition metal composite oxide further contains M1, wherein M1 represents at least one element selected from the group consisting of the group 4 to 6 elements. A proportion of M1 in the lithium-transition metal composite oxide based on the total amount of metal elements excluding Li may be within a range of 0 mol %<M1≤5 mol %. M1 may form a solid solution in a crystal of the lithium-transition metal composite oxide, may precipitate on the particle surfaces or a particle boundary, or may be both thereof. The lithium-transition metal composite oxide containing M1 may improve durability and safety of the battery.

An example of a preferable lithium-transition metal composite oxide is a composite oxide represented by the general formula $Li_aNi_xMn_yCo_zM2_wM3_vB_uO_{2-b}$, wherein $0.8<a<1.2$, $0.80\leq x\leq 0.95$, $0<y\leq 0.20$, $0\leq z<0.20$, $0\leq w\leq 0.05$, $0\leq v\leq 0.05$, $0<u\leq 0.03$, $0\leq b<0.05$, $x+y+z+w+v+u=1$, M2 represents at least one or more elements selected from the group consisting of Zr, Ti, Mo, Ta, Nb, and W, and M3 represents at least one or more elements selected from the group consisting of Mg, Ca, Sr, Al, and Si. The mole fractions of the metal elements contained in the entire particles of the lithium-transition metal composite oxide may be measured with an inductively coupled plasma atomic emission spectrometer (ICP-AES), an electron probe microanalyzer (EPMA), an energy dispersive X-ray analyzer (EDX), and the like.

Next, an example of a method of manufacturing the positive electrode active material including the lithium-transition metal composite oxide will be described.

A method of manufacturing the positive electrode active material comprises, for example: a first step of obtaining a composite oxide including Ni, Mn, and an optional metal element; a second step of mixing the composite oxide obtained in the first step and a lithium compound to obtain a mixture; a third step of calcining this mixture to obtain a calcined product; and a fourth step of adding a B compound to the calcined product to obtain the positive electrode active material having B present on the surface thereof.

In the first step, for example, with stirring a solution of metal salts including Ni, Mn, and the optional metal element (such as Co), a solution of an alkali such as sodium hydroxide is added dropwise in order to adjust a pH on the alkaline side (for example, 8.5 to 12.5) to precipitate (coprecipitate) a composite hydroxide including Ni, Mn, and the optional metal element. The composite hydroxide is calcined to obtain a composite oxide including Ni, Mn, and the optional metal element. The calcining temperature is not particularly limited, and for example, within a range of 300° C. to 600° C.

In the second step, the composite oxide obtained in the first step and the lithium compound are mixed to obtain a mixture. Examples of the lithium compound include $Li_2CO_3$, LiOH, $Li_2O$, $LiNO_3$, $LiNO_2$, $LiSO_4$, $LiOH{\cdot}H_2O$, LiH, and LiF. In the second step, other metal raw materials may be added as necessary when the composite oxide obtained in the first step and the lithium compound are mixed. The other metal raw materials are oxides and the like including metal elements other than the metal elements constituting the composite oxide obtained in the first step. Examples thereof include $Nb_2O_3$.

In the third step, the mixture obtained in the second step is calcined to obtain a calcined product. The calcination of the mixture in the third step may be performed under an oxygen flow at 450° C. to 800° C., for example, and the mixture may be calcined in multiple steps. The obtained calcined product may be washed with a liquid such as water, and dried.

In the fourth step, the calcined product obtained in the third step and the B raw material are dry-mixed, heat-treated, and crushed to obtain the positive electrode active material having B present on the particle surfaces thereof. The heat treatment in the fourth step may be performed under the atmospheric atmosphere at 200° C. to 500° C., for example. Examples of the B raw material include boric acid ($H_3BO_3$), metaboric acid ($HBO_2$), and tetraboric acid ($H_2B_4O_7$).

[Negative Electrode]

The negative electrode 12 has a negative electrode current collector 40 and a negative electrode mixture layer 41 formed on a surface of the negative electrode current collector 40. For the negative electrode current collector 40, a foil of a metal stable within a potential range of the negative electrode 12, such as copper and a copper alloy, a film in which such a metal is disposed on a surface layer thereof, and the like may be used. The negative electrode mixture layer 41 includes a negative electrode active material and a binder. The negative electrode 12 may be produced by applying a negative electrode mixture slurry including the negative electrode active material, the binder, and the like on the surface of the negative electrode current collector 40, drying and subsequently compressing the applied film to form the negative electrode mixture layers 41 on both the surfaces of the negative electrode current collector 40.

The negative electrode active material included in the negative electrode mixture layer 41 is not particularly limited as long as it may reversibly occlude and release lithium ions, and a carbon material such as graphite may be used, for example. The graphite may be any of: a natural graphite such as flake graphite, massive graphite, and amorphous graphite; and an artificial graphite such as massive artificial graphite and graphitized mesophase-carbon microbead. For the negative electrode active material, a Si-based active material constituted with at least one of Si and a Si-containing compound may be used. The carbon-based active material and the Si-based active material may be used in combination.

For the binder included in the negative electrode mixture layer 41, a fluorine-containing resin such as PTFE and PVdF, PAN, a polyimide, an acrylic resin, a polyolefin, and the like may be used similar to that in the positive electrode 11, but styrene-butadiene rubber (SBR) is preferably used. The negative electrode mixture layer 41 may include CMC or a salt thereof, polyacrylic acid (PAA) or a salt thereof, polyvinyl alcohol (PVA), and the like.

The negative electrode mixture layer 41 has B present at least on the surface thereof, and contains 30 mass ppm or more and 1000 mass ppm or less of B based on a total mass of the negative electrode mixture layer 41. This allows an appropriate amount of B to be present together with the precipitated Ni and the like on the surface of the negative electrode mixture layer 41, and the deterioration caused by Ni and the like may be inhibited. The presence of B on the surface of the negative electrode mixture layer 41 may be confirmed by analysis with an SEM, a TEM, an EPMA, and the like.

The content of B in the negative electrode mixture layer 41 based on the total mass of the negative electrode mixture layer 41, that is, the content rate of B in the negative electrode mixture layer 41 may be calculated by the following method.

(1) Ion-exchanged water is added to the negative electrode 12 to release the negative electrode mixture layer 41.

(2) The negative electrode mixture layer 41 is cut out, and the weight is measured.

(3) To the cut negative electrode mixture layer 41, aqua regia and hydrofluoric acid are added and heated for dissolution, and an insoluble component such as carbon is filtered off to produce an aqueous solution. The aqueous solution is diluted with ion-exchanged water up to a predetermined volume. A measurement result of a B concentration by ICP-AES is specified as the content of B in the negative electrode mixture layer 41.

(4) The content of B in the negative electrode mixture layer 41 measured in (3) is divided by the weight of the negative electrode mixture layer 41 measured in (2) to be specified as the content rate of B in the negative electrode mixture layer 41.

After a non-aqueous electrolyte secondary battery 10 comprising the positive electrode 11, the negative electrode 12, and a non-aqueous electrolyte, described later, is produced, high-temperature aging treatment is performed. This high-temperature aging treatment may transfer B from the positive electrode 11, to allow B to be present on the surface of the negative electrode mixture layer 41, while allowing the negative electrode mixture layer 41 to contain the appropriate amount of B. The high-temperature aging treatment is a treatment of maintaining the secondary battery 10 at a high temperature after charging in order to transfer B from the positive electrode 11 to the negative electrode 12. The temperature and time of the high-temperature aging treatment are not particularly limited, and for example, the temperature may be maintained at 60° C. for 9 hours.

The negative electrode mixture layer 41 further has Ni present on the surface thereof, and in the negative electrode mixture layer 41, a molar ratio of Ni to B may be $0.05 \le Ni/B \le 1.0$. On the surface of the negative electrode mixture layer 41, Ni eluted from the positive electrode 11 is easily precipitated. The presence of Ni on the surface of the negative electrode mixture layer 41 may be confirmed with an SEM. A content rate of Ni in the negative electrode mixture layer 41 may be calculated similar to the content rate of B, described above, From the ratio of the content rates of Ni and B, the molar ratio of Ni to B (Ni/B) in the negative electrode mixture layer 41 may be calculated.

When the positive electrode active material contains M1, the negative electrode mixture layer 41 may further contain M1 on the surface thereof. On the surface of the negative electrode mixture layer 41, M1 eluted from the positive electrode 11 is easily, precipitated. The presence of M1 on the surface of the negative electrode mixture layer 41 may be confirmed with an SEM. In the negative electrode mixture layer 41, a molar ratio of M1 to B may be $0.05 \leq M1/B \leq 1.0$. A content rate of M1 in the negative electrode mixture layer 41 may be calculated similar to the content rate of B, described above. From the ratio of the content rates of M1 and B, the molar ratio of M1 to B (M1/B) in the negative electrode mixture layer 41 may be calculated.

[Separator]

For the separator 13, a porous sheet having an ion permeation property and an insulation property is used, for example. Specific examples of the porous sheet include a fine porous thin film, a woven fabric, and a nonwoven fabric. For a material of the separator 13, a polyolefin such as polyethylene and polypropylene, cellulose, and the like are preferable. The separator 13 may have a single-layered structure, or may have a multilayered structure. On a surface of the separator 13, a resin layer with high heat-resistance, such as an aramid resin, and a filler layer including a filler of an inorganic compound may be provided.

[Non-Aqueous Electrolyte]

The non-aqueous electrolyte may include, for example, a non-aqueous solvent and an electrolyte salt dissolved in the non-aqueous solvent. Examples of the non-aqueous solvent include esters, ethers, nitriles, amides, and a mixed solvent of two or more thereof. The non-aqueous solvent may contain a halogen-substituted derivative in which hydrogen of these solvents is at least partially substituted with a halogen atom such as fluorine. For the electrolyte salt, a lithium salt such as is used, for example. The lithium salt may be used singly, or a plurality of types thereof may be mixed to be used. A concentration of the lithium salt may be, for example, 0.8 mol to 1.8 mol per litter of the non-aqueous solvent. Furthermore, vinylene carbonate (VC) and a propanesultone-based additive may be added.

EXAMPLES

Hereinafter, the present disclosure will be further described with Examples and

Comparative Examples, but the present disclosure is not limited to these Examples.

Example 1

[Production of Positive Electrode Active Material]

A composite hydroxide obtained by a coprecipitation method and represented by $[Ni_{0.85}Co_{0.08}Mn_{0.07}O_2](OH)_2$ was calcined at 500° C. for 8 hours to obtain a composite oxide ($Ni_{0.085}Co_{0.08}Mn_{0.07}O_2$) (the first step). Then, lithium hydroxide (LiOH) and the above composite oxide were mixed so that a molar ratio between Li and a total amount of Ni, Co, and Mn was 1.02:1 (the second step). This mixture was calcined under an oxygen flow from a room temperature to 720° C., and then the obtained calcined product was washed with water and dried (the third step). This washed and dried calcined product and boric acid ($H_3BO_3$) were dry-mixed so that a molar ratio between a total amount of Ni, Co, and Mn, and B in $H_3BO_3$ was 1:0.01, the mixture was calcined in the atmosphere at 300° C. for 3 hours, and crushed to obtain a positive electrode active material of Example 1, which had B present on the particle surfaces thereof (the fourth step), ICP-AES analysis demonstrated that the positive electrode active material of Example 1 had a composition of $LiNi_{0.842}Co_{0.079}Mn_{0.069}B_{0.01}O_2$.

[Production of Positive Electrode]

The above positive electrode active material, acetylene black, and polyvinylidene fluoride (PVdF) were mixed at a solid-content mass ratio of 96.3:2.5:1.2, an appropriate amount of N-methyl-2-pyrrolidone (NMP) was added, and then this mixture was kneaded to prepare a positive electrode mixture slurry. This positive electrode mixture slurry was applied on a positive electrode current collector made of aluminum foil, the applied film was dried, then the applied film was rolled by using a roller, and cut to a predetermined electrode size to obtain a positive electrode in which positive electrode mixture layers were formed on both the surfaces of the positive electrode current collector. An exposed part where the surface of the positive electrode current collector was exposed was provided on part of the positive electrode.

[Production of Negative Electrode]

Natural graphite was used as a negative electrode active material. The negative electrode active material, sodium carboxymethylcellulose (CMC-Na), and styrene-butadiene rubber (SBR) were mixed at a solid-content mass ratio of 100:1:1 in an aqueous solution to prepare a negative electrode mixture slurry. This negative electrode mixture slurry was applied on both surfaces of a negative electrode current collector made of copper foil, the applied film was dried, then the applied film was rolled by using a roller, and cut to a predetermined electrode size to obtain a negative electrode in which negative electrode mixture layers were formed on both the surfaces of the negative electrode current collector. An exposed part where the surface of the negative electrode current collector was exposed was provided on a part of the negative electrode.

[Preparation of Non-Aqueous Electrolyte]

Ethylene carbonate (EC), ethyl methyl carbonate (EMC), and dimethyl carbonate (DMC) were mixed at a volume ratio of 3:3:4. In this mixed solvent, lithium hexafluorophosphate ($LiPF_6$) was dissolved at a concentration of 1.1 mol/L. Into the mixed solvent, vinylene carbonate (VC) was dissolved at a concentration of 2.0 mass % to prepare a non-aqueous electrolyte.

[Production of Test Cell]

An aluminum lead was attached to the exposed part of the above positive electrode, a nickel lead was attached to the exposed part of the above negative electrode, the positive electrode and the negative electrode were spirally wound with a separator made of a polyolefin interposed therebetween, and then press-formed in the radial direction to produce a flat, wound electrode assembly. This electrode assembly was housed in an exterior, the above non-aqueous electrolyte was injected thereinto, and then an opening of the exterior was sealed to obtain a test cell.

[High-Temperature Aging Treatment]

Under a temperature environment of 25° C., the above test cell was charged at a constant current of 0.1 C until a battery voltage reached 4.2 V, and charged at a constant voltage of 4.2 V until a current value reached 0.05 C. Then, the test cell was discharged at a constant current of 0.1 C until the battery voltage reached 2.5 V. Thereafter, the test cell was charged at a constant current of 0.1 C until the battery voltage reached 3.7 V, and charged at a constant voltage of 3.7 V until the current value reached 0.05 C. This test cell in the charged state was maintained under a temperature environment of 60° C. for 9 hours. Thereafter, under a temperature environment of 25° C., the test cell was charged at a constant current of 0.1 C until the battery voltage reached 4.2 V, charged at a constant voltage of 4.2 V until the current value reached 0.05 C, and then discharged at a constant current of 0.1 C until the battery voltage reached 2.5 V. This test cell after the high-temperature aging treatment was used as an initial test cell.

[Evaluation of Capacity Maintenance Rate]

The following high-temperature cycle test was performed on the above initial test cell. A discharge capacity at the 1st cycle and a discharge capacity at the 300th cycle in the high-temperature cycle test were determined, and a capacity maintenance rate was calculated by the following formula.

Capacity Maintenance Rate (%)=(Discharge Capacity at 300th Cycle/Discharge Capacity at 1st Cycle)×100

High-Temperature Cycle Test

Under a temperature environment of 45° C., the test cell was charged at a constant current of 0.5 C until a battery voltage reached 4.2 V, and charged at a constant voltage of 4.2 V until a current value reached 0.02 C. Then, the test cell was discharged at a constant current of 0.5 C until the battery voltage reached 2.5 V. This charge-discharge cycle was repeated 300 times. After the high-temperature cycle test, a content rate of B in the negative electrode mixture layer was 221 ppm, and a molar ratio of Ni to B (Ni/B) in the negative electrode mixture layer was 0.19. Note that the transfer of B from the positive electrode to the negative electrode occurs during the high-temperature aging treatment.

Example 2

A test cell was produced and evaluated in the same manner as in Example 1 except that, in the second step of the production of the positive electrode active material, LiOH, the composite oxide, and $Nb_2O_5$ were mixed so that a molar ratio between Li, a total amount of Ni, Co, and Mn, and Nb was 1.02:1:0.01. ICP-AES analysis demonstrated that the positive electrode active material of Example 2 had a composition of $LiNi_{0.833}Co_{0.078}Mn_{0.069}Nb_{0.01}B_{0.01}O_2$. After the high-temperature cycle test, a content rate of B in the negative electrode mixture layer was 114 ppm, a molar ratio of Ni to B (Ni/B) in the negative electrode mixture layer was 0.10, and a molar ratio of Nb to B (Nb/B) in the negative electrode mixture layer was 0.23.

Comparative Example 1

A test cell was produced and evaluated in the same manner as in Example 1 except that, in the production of the positive electrode active material, the fourth step was not performed. ICP-AES analysis demonstrated that the positive electrode active material of Comparative Example 1 had a composition of $LiNi_{0.85}Co_{0.08}Mn_{0.07}O_2$.

Comparative Example 2

A test cell was produced and evaluated in the same manner as in Example 2 except that, in the production of the positive electrode active material, the fourth step was not performed. ICP-AES analysis demonstrated that the positive electrode active material of Comparative Example 2 had a composition of $LiNi_{0.842}Co_{0.079}Mn_{0.069}Nb_{0.01}O_2$.

Table 1 shows the evaluation result of the capacity maintenance rate. Table 1 also shows the composition of the positive electrode active material, the content rate of B in the negative electrode mixture layer, the molar ratio of Ni to B (Ni/B) in the negative electrode mixture layer, and the molar ratio of Nb to B (Nb/B) in the negative electrode mixture layer.

TABLE 1

| | Composition of positive electrode active material | | | | | Negative electrode mixture layer | | | Evaluation result Capacity |
|---|---|---|---|---|---|---|---|---|---|
| | Ni (mol %) | Co (mol %) | Mn (mol %) | Nb (mol %) | B (mol %) | B (mass ppm) | Ni/B | Nb/B | maintenance rate (%) |
| Example 1 | 84.2 | 7.9 | 6.9 | — | 1.0 | 221 | 0.19 | — | 83.5 |
| Example 2 | 83.3 | 7.8 | 6.9 | 1.0 | 1.0 | 114 | 0.10 | 0.23 | 83.5 |
| Comparative Example 1 | 85.0 | 8.0 | 7.0 | — | — | — | — | — | 78.4 |
| Comparative Example 2 | 84.2 | 7.9 | 6.9 | 1.0 | — | — | — | — | 75.2 |

As shown in Table 1, the test cells of Examples 1 and 2 had higher capacity maintenance rates after the high-temperature cycle than the test cells of Comparative Examples 1 and 2.

REFERENCE SINGS LIST

10 Non-aqueous electrolyte secondary battery
11 Positive electrode
12 Negative electrode
13 Separator
14 Electrode assembly
15 Battery case
16 Exterior housing can
17 Sealing assembly
18, 19 Insulating plate
20 Positive electrode tab
21 Negative electrode tab
22 Groove
23 Bottom plate
24 Lower vent member
25 Insulating member
26 Upper vent member
27 Cap
28 Gasket

30 Positive electrode current collector

31 Positive electrode mixture layer

40 Negative electrode current collector

41 Negative electrode mixture layer

The invention claimed is:

1. A non-aqueous electrolyte secondary battery, comprising:

a positive electrode;

a negative electrode; and a non-aqueous electrolyte, wherein the positive electrode has a positive electrode current collector and a positive electrode mixture layer formed on a surface of the positive electrode current collector and including a positive electrode active material, the positive electrode active material includes a lithium-transition metal composite oxide containing at least Ni, Mn, B, and M1, wherein M1 represents at least one element selected from the group consisting of groups 4 to 6 elements, a proportion of Ni in the lithium-transition metal composite oxide based on a total amount of metal elements excluding Li is within a range of 80 mol %≤Ni≤95 mol %, a proportion of Mn in the lithium-transition metal composite oxide based on the total amount of metal elements excluding Li is within a range of 0 mol %<Mn≤20 mol %, a proportion of B in the lithium-transition metal composite oxide based on the total amount of metal elements excluding Li is within a range of 0 mol %<B≤3 mol %, a proportion of M1 in the lithium-transition metal composite oxide based on the total amount of metal elements excluding Li is within a range of 0 mol %<M1≤5 mol %, the lithium-transition metal composite oxide has B present at least on a surface thereof, the negative electrode has a negative electrode current collector and a negative electrode mixture layer formed on a surface of the negative electrode current collector and including a negative electrode active material, the negative electrode mixture layer has B present at least on a surface thereof, and contains 30 mass ppm or more and 1000 mass ppm or less of B based on a total mass of the negative electrode mixture layer, the negative electrode mixture layer contains M1 on the surface thereof, and a molar ratio of M1 to B in the negative electrode mixture layer is 0.05≤M1/B≤1.0.

2. The non-aqueous electrolyte secondary battery according to claim 1, wherein the negative electrode mixture layer further has Ni present on the surface thereof, and a molar ratio of Ni to B in the negative electrode mixture layer is 0.05≤Ni/B≤1.0.

3. The non-aqueous electrolyte secondary battery according to claim 1, wherein the lithium-transition metal composite oxide is represented by the general formula $Li_aNi_xMn_yCo_zM2_wM3_vB_uO_{2-b}$, wherein 0.8<a<1.2, 0.80≤x≤0.95, 0<y≤0.20, 0≤z<0.20, 0≤w≤0.05, 0≤v≤0.05, 0<u≤0.03, 0≤b<0.05, x+y+z+w+v+u=1, M2 represents at least one or more elements selected from the group consisting of Zr, Ti, Mo, Ta, Nb, and W, and M3 represents at least one or more elements selected from the group consisting of Mg, Ca, Sr, Al, and Si.

4. The non-aqueous electrolyte secondary battery according to claim 1, wherein the proportion of B in the lithium-transition metal composite oxide based on the total amount of metal elements excluding Li is within a range of 0 mol %<B≤1 mol %.

* * * * *